United States Patent
Ketzenberg et al.

(10) Patent No.: US 8,161,668 B2
(45) Date of Patent: Apr. 24, 2012

(54) ANIMAL LIMB PROTECTIVE BOOT

(76) Inventors: Laurie Ketzenberg, Fogelsville, PA (US); Matt Cohen, Fogelsville, PA (US)

(*) Notice: Subject to any disclaimer, the term of this patent is extended or adjusted under 35 U.S.C. 154(b) by 649 days.

(21) Appl. No.: 12/316,414

(22) Filed: Dec. 11, 2008

(65) Prior Publication Data

US 2009/0094864 A1 Apr. 16, 2009

Related U.S. Application Data

(63) Continuation-in-part of application No. 11/175,827, filed on Jul. 6, 2005, now abandoned.

(60) Provisional application No. 60/586,908, filed on Jul. 9, 2004.

(51) Int. Cl.
  *A61D 9/00* (2006.01)
  *A01K 13/00* (2006.01)

(52) U.S. Cl. .......... 36/111; 36/7.1 R; 119/850

(58) Field of Classification Search .......... 36/111, 36/7.1 R, 2 R, 1.5; 119/850; D30/146
See application file for complete search history.

(56) References Cited

U.S. PATENT DOCUMENTS

| | | | | |
|---|---|---|---|---|
| 2,443,831 A * | 6/1948 | Miller | ............ | 54/79.1 |
| 2,446,371 A * | 8/1948 | Jones | ............ | 36/111 |
| 3,762,073 A * | 10/1973 | Cantales | ............ | 36/111 |
| D267,750 S * | 1/1983 | Norstrom | ............ | D30/146 |
| 4,911,150 A * | 3/1990 | Farley | ............ | 602/23 |
| 5,495,828 A * | 3/1996 | Solomon et al. | ............ | 119/850 |
| 5,499,459 A * | 3/1996 | Tomaro | ............ | 36/10 |
| D379,251 S * | 5/1997 | Mezey | ............ | D30/146 |
| 5,787,607 A * | 8/1998 | Schurch | ............ | 36/7.1 R |
| 5,815,948 A * | 10/1998 | Dzielak | ............ | 36/2 R |
| 6,186,097 B1 * | 2/2001 | Brockmann et al. | ............ | 119/850 |
| 6,470,832 B1 * | 10/2002 | Peacock | ............ | 119/850 |
| 2005/0241188 A1 * | 11/2005 | Yun et al. | ............ | 36/111 |
| 2006/0060155 A1 * | 3/2006 | Ip | ............ | 119/850 |
| 2007/0028857 A1 * | 2/2007 | Cooney | ............ | 119/850 |
| 2007/0074677 A1 * | 4/2007 | Behme | ............ | 119/850 |

* cited by examiner

*Primary Examiner* — Ted Kavanaugh
(74) *Attorney, Agent, or Firm* — Brad M. Behar & Associates, PLLC (57) ABSTRACT

A protective boot for an animal including a generally cylindrical leg portion having a top end and a bottom end and a top closure affixed to and circumscribing the top end of the leg portion that is drawn inward against the leg of the animal to protect against the infiltration of extraneous material into and against the self-removal of the protective boot by the animal. The base portion of the protective boot is sealed to the bottom end of the leg portion and is enhanced with a non-slip material to provide substitute traction for the animal. At least one strap is fixedly connected to the leg portion and is operable to reduce the diameter of the leg portion in the vicinity of the strap. The protective boot is sealed at each seam or point of attachment between elements so that the boot is waterproof.

19 Claims, 5 Drawing Sheets

ANIMAL LIMB PROTECTIVE BOOT

RELATED PATENT APPLICATION DATA

The present application is a Continuation-in-Part that claims priority from U.S. Non-Provisional Patent Application Ser. No. 11/175,827, filed on Jul. 6, 2005, now abandoned which claims priority from U.S. Provisional Patent Application Ser. No. 60/586,908, filed on 9 Jul. 2004.

FIELD OF INVENTION

The present invention relates to a protective boot that can be placed over an animal's paw and leg, such as after surgery, in order to protect the surgical area, bandages, casts or splints from dirt and possibly reduce infections. Additionally, the boot can dissuade the animal from pawing or gnawing at the surgical site and opening the wound.

BACKGROUND OF THE INVENTION

Animals, such as dogs and cats occasionally suffer injuries to their legs and paws that require orthopedic or other corrective surgery. Additionally, these animals may also suffer cuts and scrapes to their legs and paws as they walk through brush or in uneven paved areas. Veterinary assistance for these injuries can cost in the hundreds, if not thousands, of dollars.

Typically, after the animal's wound is attended to, the wound is bandaged and/or splinted to aid in recovery and/or to prevent dirt and debris from getting into the wound and possibly causing an infection. The bandages, casts, splints, or other devices utilized to treat the injured leg of the animal ought to be protected from water, dirt, or other debris that the animal can come in contact with. This is often done by placing the wound or injured leg in a plastic bag when the animal enters a potentially contaminating environment, such as the outdoors. However, the bag may rip or the animal may gnaw at the bag or attempt to physically remove it by clawing at the bag, thus exposing the injured leg to the adverse elements. This may create an additional problem associated with the ingestion of the gnawed portions of the bag. Additionally, retention of the plastic bag on the leg of the animal is usually accomplished by tying the bag to the leg with string or by using rubber bands over the bag. Such methods limit the tolerability and comfort of the animal, thus increasing the probability of the animal gnawing and/or clawing and removing the bag from its injured leg. Also, a medical issue associated with decreased blood circulation may arise if the band or string is tied too tightly around the leg. To date, there is an unmet medical need to provide a covering, for an injured leg of an animal, that is resilient against adverse elements, and fosters tolerance and comfort for the animal.

There have been several attempts made to provide a boot to protect an animal's extremities. None of these describes a boot that extends beyond the intermediate flexible joint of the animal. For example, U.S. Pat. No. 4,458,431 [Sinclair], U.S. Pat. No. 5,148,657 [Stafford, et al.], U.S. Pat. No. 5,495,828 [Solomon, et al.], U.S. Pat. No. 6,526,920 [Griffin], U.S. Pat. No. 6,546,704 [Fisher], U.S. Design Patent 379,251 [Mezey], U.S. Design Patent 382,378 [Stark], and U.S. Design Patent 417,530 [Darek] disclose a myriad of designs, styles, and types of dog boots, primarily for the paw and lower extremity that extend upward to only a point well below the intermediate flexible joint of the leg. Moreover, the majority of the aforementioned boots do not adequately protect the leg of the animal against the wide range of adverse elements, including water and debris.

For example, the boot disclosed by U.S. Pat. No. 4,458,431 [Sinclair] includes a seam along the top of the boot. This seam may allow water penetration inside the boot, thereby affecting the wound, if the boot is immersed in water, such as walking through a puddle or stream. U.S. Pat. No. 5,148,657 [Stafford] discloses an animal boot with a tongue, a design that may also allow water to penetrate the affected area. Some boots disclosed are waterproof, however, they may be expensive to manufacture, and they do not provide protection near or above the intermediate flexible joint of the animal. For example, U.S. Pat. No. 5,495,828 [Solomon, et al.] discloses an animal boot that is manufactured through a complex and potentially costly polymer dipping process. Further, none of the described boots provides an upper closure mechanism to prevent the downward infiltration of water, dirt, or debris and/or prevent physical access by the animal to the upper portion of the protective boot.

It would be beneficial to provide a protective animal boot that is water proof, relatively easy and inexpensive to manufacture, and extends to the upper region of the extremity (above the second flexible joint) to increase the range of protection. Additionally, as dogs and cats, or other domesticated animals such as goats and sheep, or small exotic animals such as ferrets, have a tendency to remove any type of clothing or footwear, positioning a boot in the upper part of the leg prevents access by the animal to remove the boot.

It is, therefore, an object of the invention to protect the injured leg of the animal by use of an oversized protective sheath or boot that prevents the animal from physically undoing of the bandages or other medical treatment devices intended the protect the wound, or from directly opening the wound. It is a further object of the invention to provide an area of protection that extends along the entire length of the animal's leg, rather than just the area around and including the paw. Moreover, it is another object of the invention to provide a closure mechanism to secure the open top end of the protective boot against the infiltration of the various adverse elements, including the animal itself from physical entry.

Other objects will appear hereinafter.

SUMMARY OF THE INVENTION

In view of the aforementioned unmet medical needs, the present invention provides a protective boot for an animal that addresses the various shortcomings of the referenced devices. The boot comprises a generally cylindrical leg portion having a top end and a bottom end, a base portion fixedly connected to the bottom end and sealing the bottom end, and at least one strap fixedly connected to the leg portion. The at least one strap is operable to reduce the diameter of the leg portion in the vicinity of the strap.

Further, the present invention provides an oversized protective boot for an animal. The boot includes a generally cylindrical leg portion having a top end and a bottom end and a first seam extending between the bottom end and the top end, a base portion fixedly connected to the bottom end and sealing the bottom end via a second seam, and at least one strap fixedly connected to the leg portion. The cylindrical leg portion of the boot extends upward along the leg of the animal having a length sufficient to cover the lower flexible joint and intermediate flexible joint of the animal. The lower flexible joint would be the equivalent of a human ankle and the intermediate flexible joint would be the equivalent of a human knee. The boot may also extend above the intermediate flexible joint. The at least one strap is operable to reduce the diameter of the leg portion in the vicinity of the strap. The first and second seams are sealed so that the first and second seams are waterproof.

The protective boot for an animal is comprised of the following described elements. A generally cylindrical leg portion made from a flexible material having a top end and a bottom end and of a length such that the leg portion extends upwardly a length along the leg of the animal to a location along the leg above the intermediate flexible joint; a base portion fixedly connected to the bottom end and sealed to the bottom end of the leg portion; at least one strap fixedly connected to the leg portion and being operable to reduce the diameter of the leg portion in the vicinity of the strap; and a top closure affixed to and circumscribing the leg portion protecting against infiltration into the protective boot of extraneous material and against the self-removal of the protective boot by the animal. The flexible material is intended to be waterproof either as manufactured, or as treated. The top closure is formed by a circumscribing channel through which a drawstring is passed for tightening and loosening said top closure including a locking mechanism on the drawstring to retain the top end of the protective boot drawn inward against the leg of the animal. Alternatively, the top closure can be formed by an expandable elastic material circumscribing the top end of the leg portion to reduce the diameter of the protective boot around the leg of the animal which is fixedly connected along the interior of the top end of the leg portion sealing the top closure to the top end of the leg portion. The material used for the top closure expandable elastic material may be water resistant. Any location of the protective boot that is joined together at a seam is additionally protected for water resistance at the seam by a waterproof tape placed across and over the seam along the entire length of any of the described seams.

The leg portion of the protective boot may also include an exterior constructed from a coarse material to dissuade chewing or gnawing by the animal on the protective boot. The base portion of the protective boot includes an exterior constructed from a slip-resistant material to provide the animal with substitute traction for proper footing on underlying surfaces.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

In the drawings, like numerals indicate like elements throughout. The terminology includes the words specifically mentioned, derivatives thereof and words of similar import.

The embodiments illustrated below are not intended to be exhaustive or to limit the invention to the precise form disclosed. These embodiments are chosen and described to best explain the principle of the invention and its application and practical use and to enable others skilled in the art to best utilize the invention.

Figure 1:
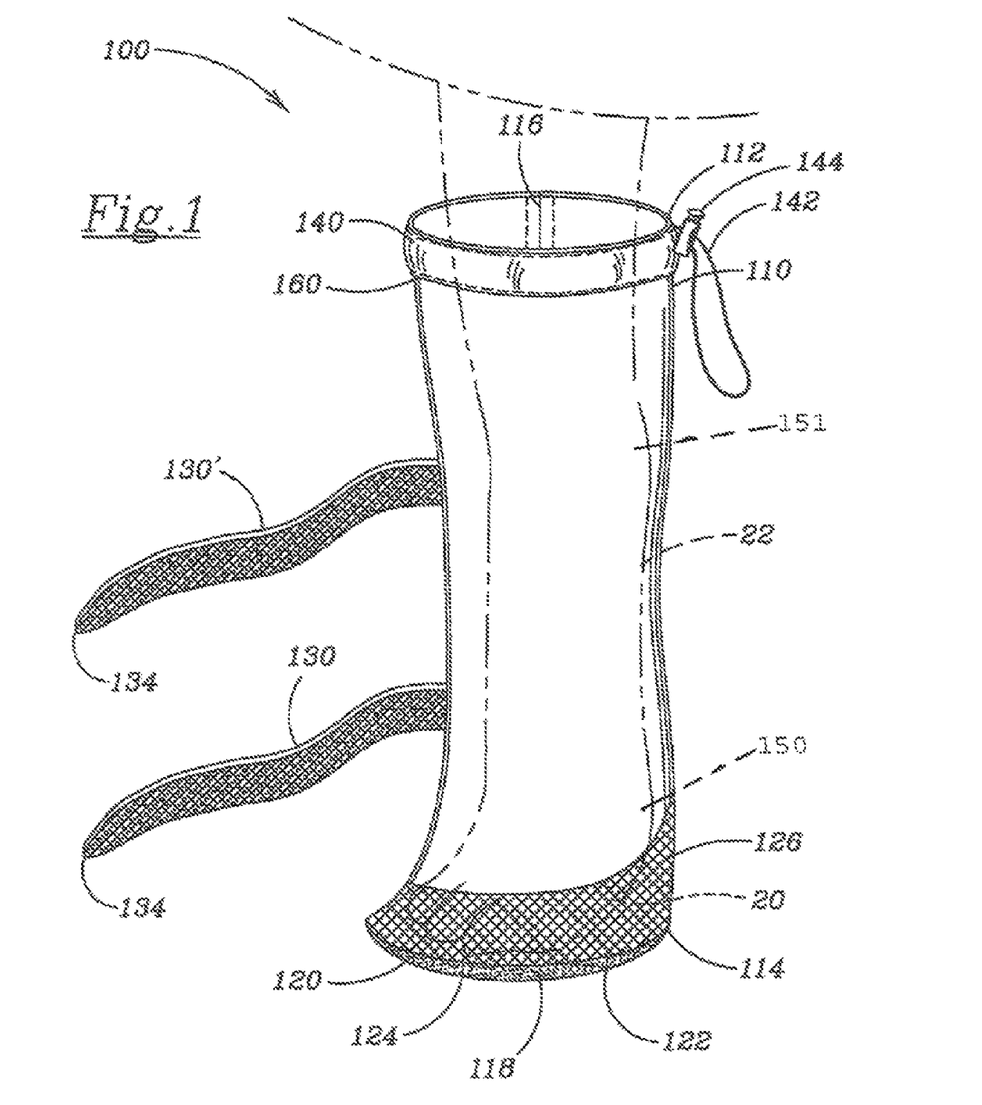
FIG. 1 is a front perspective view of an animal paw protective boot according to a first embodiment of the present invention.
Figure 2:
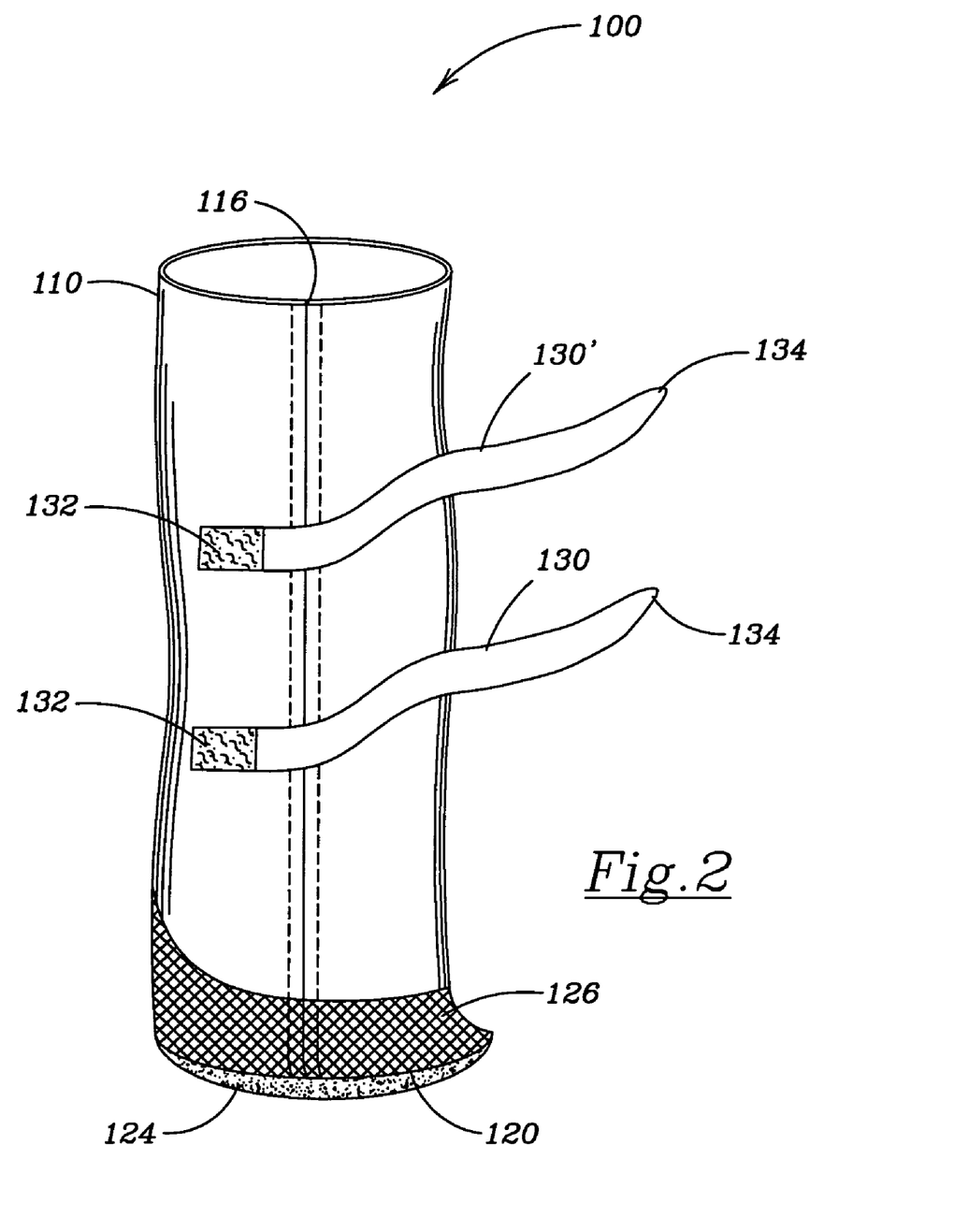
FIG. 2 is a rear perspective view of the boot shown in FIG. 1 omitting the top closure

A front perspective view of a boot 100 of the present invention is shown in use on the paw 20 and leg 22 of an animal, such as a dog, in FIG. 1. A rear perspective view of the boot 100, without the paw 20 and the leg 22, is shown in FIG. 2. The boot 100 is preferably used for veterinary purposes to aid in healing the paw 20 and/or leg 22 of the animal, such as after injury or after surgery. The boot 100 is placed over the paw 20 and leg 22 of the animal that are intended to be protected.

The boot 100 includes a leg portion 110 and a base portion 120 that is connected to the bottom of the leg portion 110. The leg portion 110 is preferably generally cylindrical in shape and includes an inner diameter that is large enough to encompass the paw 20 and leg 22 of the animal on which the boot 100 is to be used. The cylindrical leg portion 110 of the boot 100 is oversized to accommodate added girth from bandages, cast, splints, etc. applied to the animal's leg and extends upwardly along the leg of the animal for a length that covers the lower flexible joint 150 and the intermediate flexible joint 151 of the animal. The lower flexible joint 150 would be the equivalent of a human ankle and the intermediate flexible joint 151 would be the equivalent of a human knee. The boot 100 may also extend above the intermediate flexible joint 151. The leg portion 110 includes a top end 112 and a bottom end 114. The leg portion 110 may also include at least a slight taper from the top end 112 toward the bottom end 114.

Preferably, the leg portion 110 is constructed of a waterproof material, such as polyurethane coated nylon, pack cloth, or other suitable material. Alternatively, the boot 100 may be impregnated with a water resisting chemical, such as Scotch Guard®, by spraying, dipping, or other available means. The leg portion 110 is preferably manufactured from one-piece construction, with a seam 116 running longitudinally along the back of the leg portion 110. The base portion 120 is connected to the lower end 114 of the leg portion 110, such as by sewing, to form a closed lower end of the boot 100. A connecting seam 118 connects the leg portion 110 with the base portion 120. The top end 112 of the boot 100 is open to allow the paw 20 and leg 22 to be inserted therein. The fabric of the top end 112 is sewn back on itself, meeting at a seam 160, and creating a 'channel' or passageway 140 for drawstring 142 to pass through. Drawstring 142 can be utilized to decrease the diameter of the top end 112, thus creating a closure with a 'snug' fit around the top of the animal's leg 22. The end of the drawstring may have a moveable locking mechanism, an example locking mechanism 144 is shown in FIG. 1, to ensure the retention of the snug fit around the leg 22 of the animal.

The base portion 120 is fixedly connected to the bottom end 114 of the leg portion 110 and seals the bottom end 114 of the leg portion 110 to form a paw receiving section. The base portion 120 is intended to engage the ground or a floor surface when the boot 100 is worn. The base portion 120 is intended to cover the pad of the animal's paw 20 on which the boot 100 is used, with the base portion 120 acting like a loose "shoe". The base portion 120 may be the same diameter as the leg portion 110, but may also have a diameter that is at least slightly larger than the diameter of the leg portion 110 in order to comfortably accommodate the paw 20 inserted therein.

The base portion 120 preferably includes an exterior portion 122 that is constructed from a non-slip material 124, for example the non-slip material could be SLIPP-NOTT®. The non-slip material is fixedly connected to the polyurethane coated nylon, pack cloth, or other suitable material of the leg portion 110 and serves to provide the traction that the pad of the animal's paw would provide absent the protective boot. Further, a band of thicker and stiffer material may be utilized to protect the animal's paw along the lower end of the leg portion 110. This band 126 protects against both injury to the animal's paw as well as guarding against the animal's claws being used to physically remove the protective boot 100.

A plurality of straps 130, 130' are intended to be wrapped around the leg portion 110 of the boot 100 to secure the boot 100 to the animal. Preferably, each strap 130, 130' includes a single elongated piece of fabric material with a connected end 132 (shown in FIG. 2) fixedly connected to the leg portion 110. The connected end 132 is preferably connected to the leg portion 110 via sewing, producing a seam 133 where the connected end 132 is sewn to the leg portion 110. A free end 134 of each strap 130, 130' can be wrapped around the exterior of the boot 100 until each strap 130, 130' wraps around on itself. A hook and loop type securing device is preferably used to releasably secure the free end 134 of the strap to a portion of each strap 130, 130' between its connected end 132 and its free end 134. However, those skilled in the art will recognize that other types of securing devices, such as a buckle (not shown) on the strap between the free end and the connected end that is engageable with the free end of the strap may also be used.

As shown in FIG. 1, two straps 130, 130' are preferred, with one strap 130 being proximate to the bottom end 114 of the leg portion 110 and the other strap 130' being proximate to the top end 112 of the leg portion 110. However, those skilled in the art will recognize that only one strap, or more than two straps may also be used. The straps 130,130' are used to reduce the outer (oversized) diameter of the boot 100 in the vicinity of each respective strap 130, 130' to provide a snug fit of the boot 100 against the leg 22 of the animal when the leg 22 is inserted into the boot 100.

Figure 3:
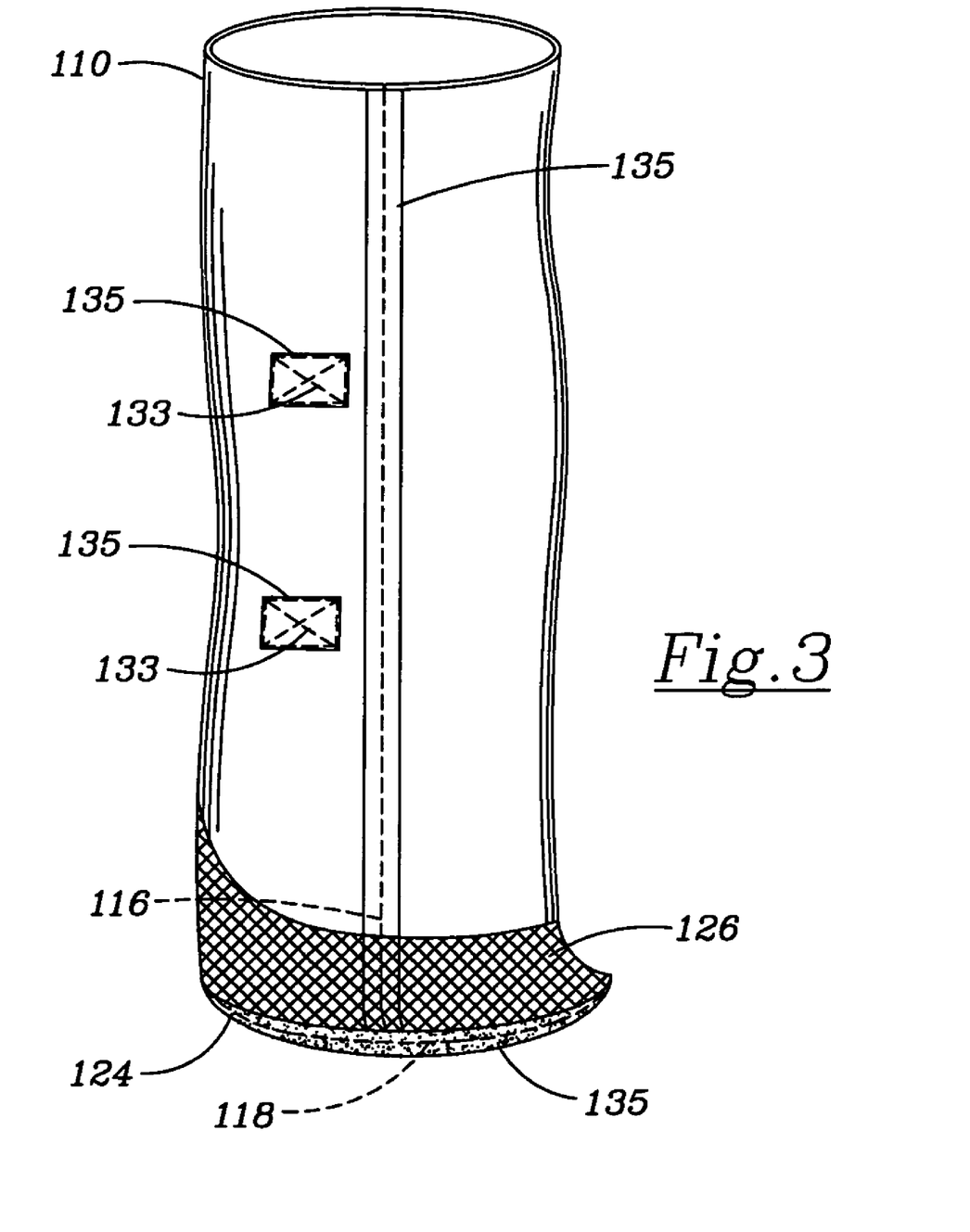
FIG. 3 is a perspective view of the boot shown in FIG. 1, in an inverted condition, also omitting the top closure.

FIG. 3 shows the boot 100 that has been inverted so that the interior of the boot 100 is depicted as the outside of boot 100. In order to maintain the waterproof integrity of the boot 100, the seams 116, 118, 133 are seam-sealed with a fiber-reinforced tape 135, as shown in FIG. 3. The boot 100 is placed on a seam sealer machine, such as a Queen Light seam sealer, to apply the seam sealing to the seams 116, 118, 133. The tape 135 that seals the seams 116, 118, 133 is applied with heat to activate adhesive on a side of the tape 135 that engages and seals the seams 116, 118, 133, as shown in FIG. 3.

Figure 4:
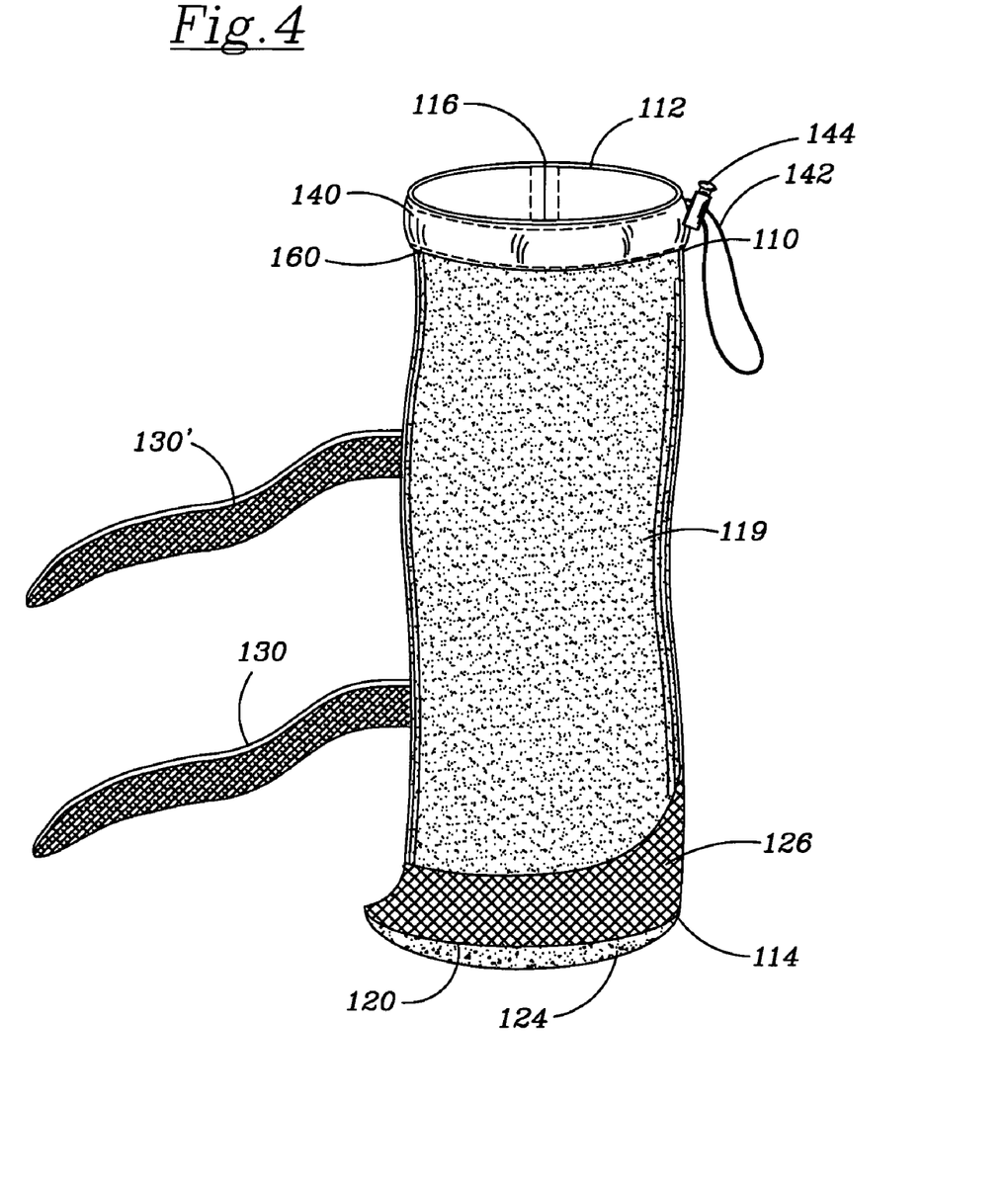
FIG. 4 is a front perspective view of the boot shown in FIG. 1, with a coarse material affixed to the exterior of the boot.

Occasionally, an animal may object to the boot 100 being affixed to its leg and may attempt to chew or gnaw the boot 100, or at least part of the boot 100, in order to remove the boot 100 from its leg. As shown in FIG. 4, it is envisioned that the exterior of the boot 100 may be constructed from a coarser material, akin to the material used for scouring pads, to form a roughened surface 119 that is unpleasant for the animal to chew or gnaw. Alternatively, the exterior of the boot 100 may be impregnated with an agent that is distasteful to the animal to discourage the animal from gnawing on the boot. An example of such an agent is hot pepper spray, which, although distasteful, is not harmful to the animal.

As well as for other uses, the boot 100 is envisioned to be used on an animal that has injured its leg 22. It may be desired to provide some type of protection to ensure that the animal does not re-injure the leg 22, at least until the leg 22 is healed. It is also envisioned that the boot 100 may be used during hydrotherapy treatments, during which time the animal's body, as well as the entire boot 100, is immersed in water. However, it is often desired that any type of bandage around the animal's leg and/or paw remains dry at all times.

Figure 5:
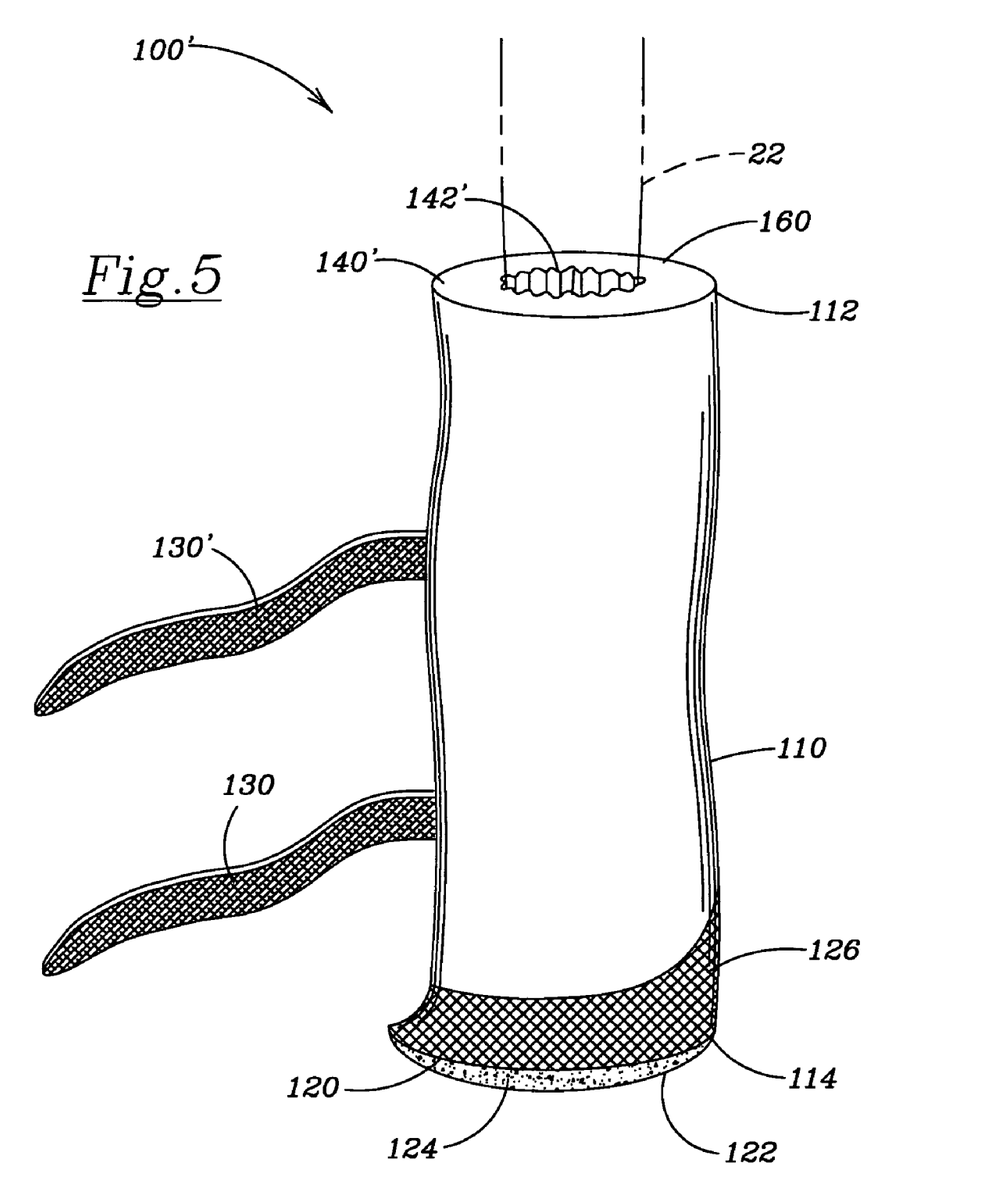
FIG. 5 is a front perspective view of a second embodiment of the boot shown in FIG. 1, with an alternative expandable closure affixed to the top end of the boot.

To solve this problem an alternative top closure for the boot 100', as shown in FIG. 5, may include an elastic expandable band 142' sewn to an expandable/contractible fabric 140', such as Lycra® or a combination of Lycra® material with a Spandex® material, circumscribing the top end 112 of the leg portion 110 and connected thereto at seam 160. Preferably, an elastic band 142' is sized so that its length generally approximates the diameter of the animal's leg. Further, the elastic band should have a minimal width and be formed in an annular or circular shape. The elastic band 142' is affixed to the inner open annular ring of the expandable/contractible fabric, which may be made from Spandex 6, such that the elastic band 142' will draw the fabric 140' inward conforming to the exterior of the animal's leg 22 to keep water out of the boot 100', yet not be so tight against the leg 22 as to cut off circulation.

Preferably, the boot 100 may be manufactured in a plurality of sizes, so that different sized dog breeds, from miniature poodles to St. Bernards, may be able to use the different sizes of the boot 100. Further, the boot 100 is not limited to dogs only, but may also be used for other animals, such as cats, or domesticated barnyard animals such as sheep or goats, or small exotic animals such as ferrets. In addition, each differently sized boot 100, having a variety of sizes such as extra-small, small, medium, large, and extra-large, is manufactured with a different color material on the top end 112 forming the channel 140 so that a veterinarian may quickly be able to determine what size of the boot 100 to use for a particular size animal. Additionally, the exterior of each boot 100 may be labeled with the name of the veterinarian's office in a different color to indicate the treating veterinarian's office.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A protective boot for an animal comprising:
a generally cylindrical leg portion of a flexible material having a top end and a bottom end, said leg portion so dimensioned to extend upwardly a length along the leg of the animal to a location along said leg above the intermediate flexible joint and oversized to be loose fitting over the leg of the animal to accommodate added girth from bandages;
a base portion configured generally circular in shape fixedly connected to the bottom end and sealing the bottom end;
at least one strap fixedly connected to the leg portion at a connected end of said strap, comprising a free end located away from the connected end such that the fixed end of the at least one strap is sealingly attached to the leg portion so that the leg portion is waterproof, said at least one strap being operable to reduce the diameter of the leg portion in the vicinity of the strap;
a top closure affixed to and circumscribing the leg portion protecting against infiltration into the protective boot of extraneous material and against the self-removal of the protective boot by the animal;
said top closure being formed by a circumscribing fabric channel through which a drawstring is passed for tightening and loosening said top closure; and
said drawstring including a locking mechanism.

2. The protective boot according to claim 1, wherein the flexible material is waterproof.

3. The protective boot according to claim 1, wherein the free end of the at least one strap comprises one side of a hook and loop fastener and the fixed end and exterior of the at least one strap comprises the other side of the hook and loop fastener.

4. The protective boot according to claim 1, said leg portion further comprising an exterior constructed from a coarse material to dissuade chewing or gnawing by the animal on the protective boot.

5. The protective boot according to claim 1, said base portion further comprising an exterior constructed from a slip-resistant material to provide the animal with substitute traction for proper footing on underlying surfaces.

6. A protective boot for an animal comprising:
a generally cylindrical leg portion of a waterproof material having a top end and a bottom end with a first seam extending between the bottom end and the top end sealing the cylindrical leg portion together, said leg portion having a length, measured from top end to the bottom end;
a base portion configured generally circular in shape fixedly connected to the bottom end of the leg portion with a second seam sealing the base portion to the bottom end of the leg portion;
wherein said length of said leg portion is at least about two times greater than a width of the generally circular base;
at least one strap comprising a connected end fixedly connected to the leg portion in a waterproof manner and a free end located away from the connected end, said at least one strap being operable to reduce the diameter of the leg portion in the vicinity of the strap;
a top closure being formed by a circumscribing fabric channel through which a drawstring is passed for tightening and loosening said top closure; and
wherein, said leg portion is so dimensioned to be oversized and loose fitting over the leg of the animal to accommodate added girth from bandages.

7. The protective boot according to claim 6, wherein the drawstring includes a locking mechanism.

8. The protective boot according to claim 6, wherein the free end of the at least one strap comprises one side of a hook and loop fastener and the fixed end and exterior of the at least one strap comprises the other side of the hook and loop fastener.

9. The protective boot according to claim 6, said leg portion further comprising an exterior constructed from a coarse material to dissuade chewing or gnawing by the animal on the protective boot.

10. The protective boot according to claim 6, said base portion further comprising an exterior constructed from a slip-resistant material to provide the animal with substitute traction for proper footing on underlying surfaces.

11. A protective boot for an animal comprising:
a generally cylindrical leg portion of a flexible material having a top end and a bottom end, said leg potion having a length measured from the top end to the bottom end and so dimensioned to be loose fitting over the leg of the animal to accommodate added girth from bandages;
a base portion configured generally circular in shape fixedly connected to the bottom end and sealing the bottom end;
at least one strap fixedly connected to the leg portion at a connected end of said strap, comprising a free end located away from the connected end such that the fixed end of the at least one strap is sealingly attached to the leg portion so that the leg portion is waterproof, said at least one strap being operable to reduce the diameter of the leg portion in the vicinity of the strap;
a top closure affixed to and circumscribing the leg portion protecting against infiltration into the protective boot of extraneous material and against the self-removal of the protective boot by the animal;
said top closure being formed by a circumscribing fabric channel through which a drawstring is passed for tightening and loosening said top closure, said drawstring including a locking mechanism; and
wherein said length of said leg portion of said boot is at least about two times greater than a width of the generally circular base.

12. The protective boot according to claim 11, wherein said top enclosure is located at said top end such that when the boot is worn by an animal said top enclosure is above the intermediate flexible joint of said animal.

13. The protective boot according to claim 12, wherein said the drawstring includes a locking mechanism.

14. The protective boot according to claim 13, wherein the free end of the at least one strap comprises one side of a hook and loop fastener and the fixed end and exterior of the at least one strap comprises the other side of the hook and loop fastener.

15. The protective boot according to claim 14, said base portion further comprising an exterior constructed from a slip-resistant material to provide the animal with substitute traction for proper footing on underlying surfaces.

16. The protective boot according to claim 15, said leg portion further comprising an exterior constructed from a coarse material to dissuade chewing or gnawing by the animal on the protective boot.

17. The protective boot according to claim 16, wherein said coarse material comprises woven nylon.

18. The protective boot according to claim 11, said leg portion comprising a bottom end with a smaller cross section than said top end such that said leg portion comprises at least a slight taper from said top end to said bottom end.

19. The protective boot according to claim 11, wherein said length of said leg portion of said boot is at least about two and one half times greater than the width of the generally circular base.

* * * * *

UNITED STATES PATENT AND TRADEMARK OFFICE
CERTIFICATE OF CORRECTION

PATENT NO. : 8,161,668 B2
APPLICATION NO. : 12/316414
DATED : April 24, 2012
INVENTOR(S) : Laurie Ketzenberg and Matt Cohen Page 1 of 1

It is certified that error appears in the above-identified patent and that said Letters Patent is hereby corrected as shown below:

IN THE SPECIFICATIONS:

Column 6, line 14 "Spandex 6" should read --Spandex®--.

Signed and Sealed this
Fifth Day of June, 2012

David J. Kappos
*Director of the United States Patent and Trademark Office*